Figures 1, 2, 3:
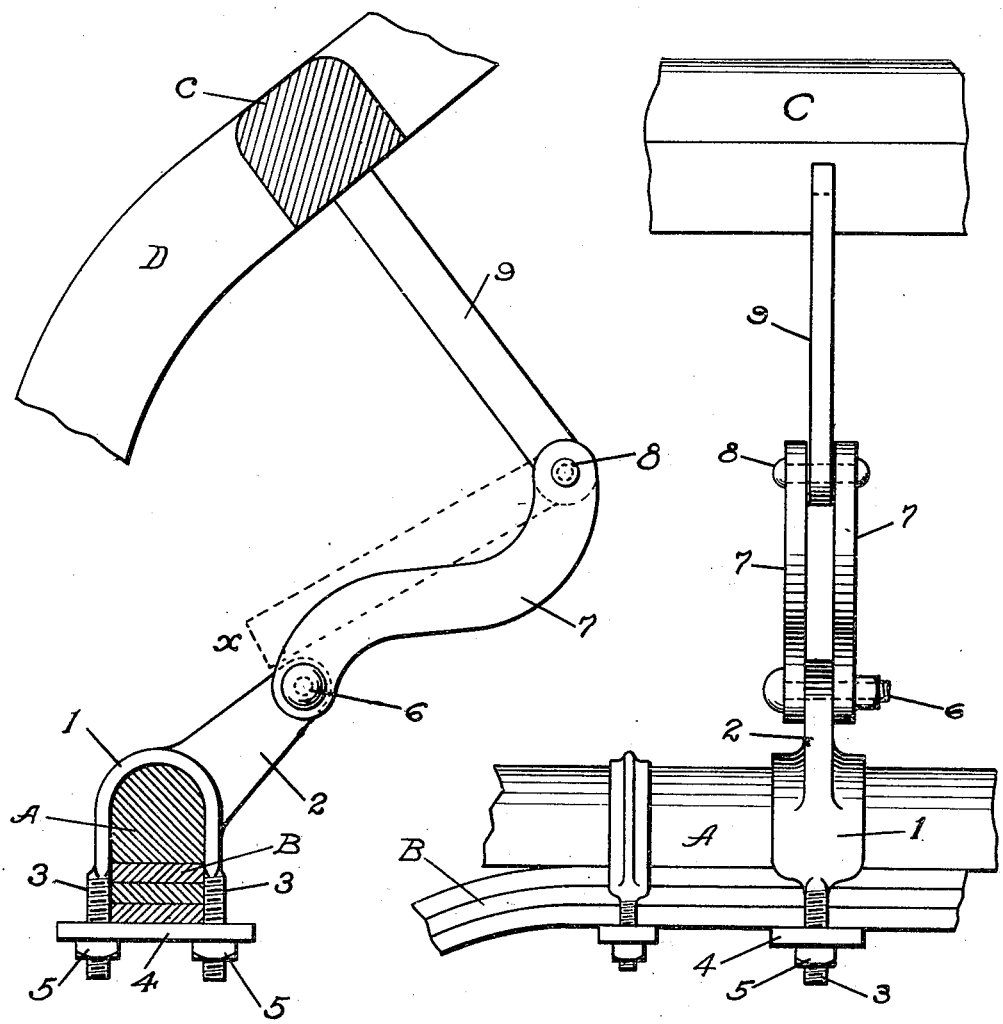

No. 825,282. PATENTED JULY 3, 1906.
S. TRACY.
SHAFT SUPPORTER.
APPLICATION FILED OCT. 24, 1905.

Witnesses
John P. Paynter
Walter J. Arnold

Inventor
Samuel Tracy
per
John A. Griffin
Attorney

UNITED STATES PATENT OFFICE.

SAMUEL TRACY, OF TOPEKA, KANSAS.

SHAFT-SUPPORTER.

No. 825,282.  Specification of Letters Patent.  Patented July 3, 1906.

Application filed October 24, 1905. Serial No. 284,243.

*To all whom it may concern:*

Be it known that I, SAMUEL TRACY, a citizen of the United States, residing at Topeka, in the county of Shawnee and State of Kansas, have invented certain new and useful Improvements in Shaft-Supporters, of which the following is a specification.

My invention relates to that class of devices which hold shafts or poles of vehicles at an elevation when the same are not in use; and it consists of an improved construction whereby cheapness, simplicity, durability, and neatness are all secured, reference being had to the accompanying drawings, and to the letters and figures of reference marked therein, which form a part of this specification, all as will be hereinafter more particularly described and claimed.

In the accompanying drawings, Figure 1 a side elevation of my invention as applied to the spring beam or bar of the vehicle; and Fig. 2 is a front elevation of the same, while Fig. 3 is a side elevation of the verified clip used on buggies having in place of a spring-bar Bailey's loop.

Similar characters of reference denote like parts in the figures.

In the drawings I have shown the U-shaped clip I, which encircles the spring-bar A, and spring B, which is formed with a pair of threaded shanks 3, which receive the nuts 5, which hold the retaining-plate 4 in engagement with the spring B, said clip being provided with an arm 2, which extends upward and forward from the spring-bar to engage the lower ends of the fingers 7, to which the same is secured by means of the bolt 6, which allows the said fingers to be adjusted at any angle to meet the requirements of the vehicle and then tightened until rigidly fixed to said arm 2.

To the upper ends of the fingers 7 is pivotally secured the arm 9 by means of the pin 8.

In Fig. 1 I have shown the arm 9 raised and engaging the cross-beam C of the shafts D, which are shown in a raised position, and to the lower shafts from their raised position all that is necessary is to raise them slightly, which allows the arm 9 to drop to the position shown at X.

My invention is adapted to be readily applied to the center of the forward spring-bar of any vehicle and adjusted as aforesaid to meet the requirements of the said vehicle.

It is of course understood that my supporter shall be made of any suitable size and material.

I am aware that prior to my invention Patent No. 304,358 was granted September 2, 1884, and do not, therefore, desire to claim, broadly, the principle shown therein; but,

Having thus fully described my said invention, what I claim as new, and desire to secure by Letters Patent, is—

1. A shaft-supporter embodying an arm rigidly supported from the vehicle, fingers adjustably secured to said arm, and a second arm pivotally secured at one end to said fingers.

2. A shaft-supporter embodying an angularly-extending arm rigidly supported from the vehicle, a pair of fingers on opposite sides of the arm adjustably secured thereto, and a second arm pivoted between said fingers at one end and at its opposite end being free to engage the shafts.

3. A shaft-supporter embodying an arm rigidly supported from the vehicle, connecting means secured to said arm, and a second arm pivotally secured to said connecting means at one end and at its opposite end being free to engage the shafts and to be folded to engage the first-named arm.

In testimony whereof I affix my signature in presence of two witnesses.

SAMUEL TRACY.

Witnesses:
 JOE ROE,
 JAS. F. GRIFFIN.